Aug. 20, 1957     A. TALBOT     2,803,349
BICYCLE STAND

Filed July 13, 1953     2 Sheets-Sheet 1

INVENTOR
ALFRED TALBOT
BY
Fetherstonhaugh & Co.
ATTORNEYS

Aug. 20, 1957   A. TALBOT   2,803,349
BICYCLE STAND

Filed July 13, 1953   2 Sheets-Sheet 2

INVENTOR
ALFRED TALBOT
BY
Fetherstonhaugh & Co.
ATTORNEYS

United States Patent Office 2,803,349
Patented Aug. 20, 1957

2,803,349

BICYCLE STAND

Alfred Talbot, Vancouver, British Columbia, Canada

Application July 13, 1953, Serial No. 367,659

3 Claims. (Cl. 211—22)

This invention relates to a frame for supporting and holding a bicycle, and in particular, to a frame which is adjustable to fit any normal size or design of bicycle.

Many types of such frames or stands have been proposed in the past but most of these were either unstable in that they would fall down at the slightest jarring, or else they were of a type that was not readily adjustable to fit any normal size or design of bicycle.

The frame of the present invention is adjustable to fit any normal length of bicycle and at the same time is adjustable to fit any normal height of bicycle.

The frame, according to the invention, has a main base member, a rear support having two upwardly projecting arms to engage and support the respective arms of the rear forks of a bicycle, and a forward support having a longitudinal channel therein to receive and hold the front wheel of the bicycle. The main base member is connected to the rear support through a first length-adjustable member, and to the forward support through a second length-adjustable member. Anchored in the main base member is a substantially vertical member which is adjustable in length and has at its upper end means for engaging and holding one of the structural bars of the bicycle.

Figure 1:
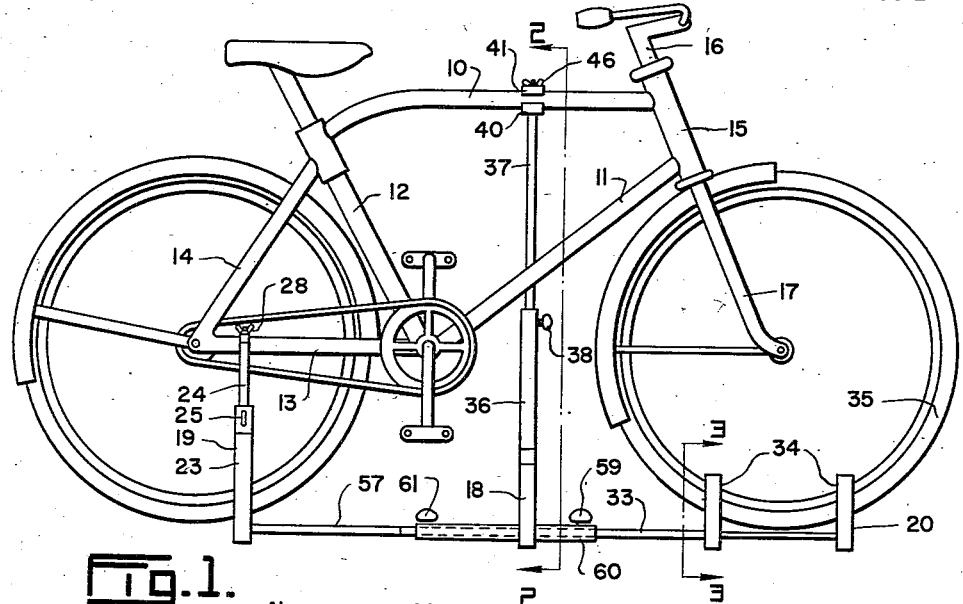
Figures 2, 3:
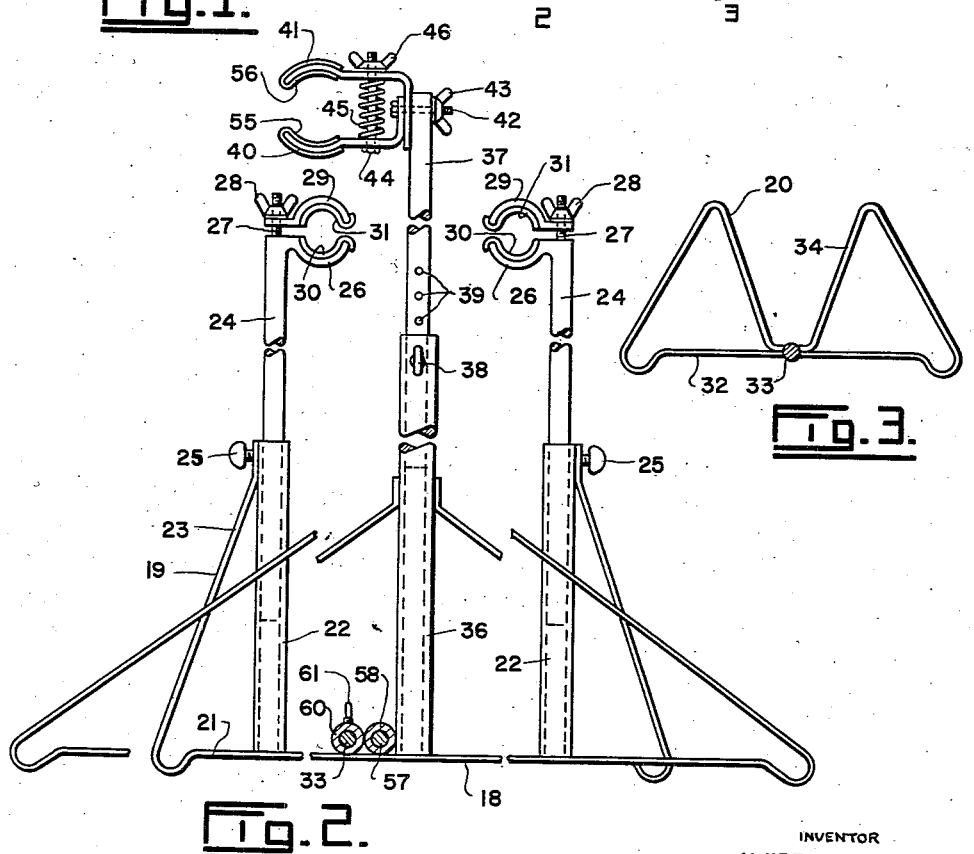
Figure 4:
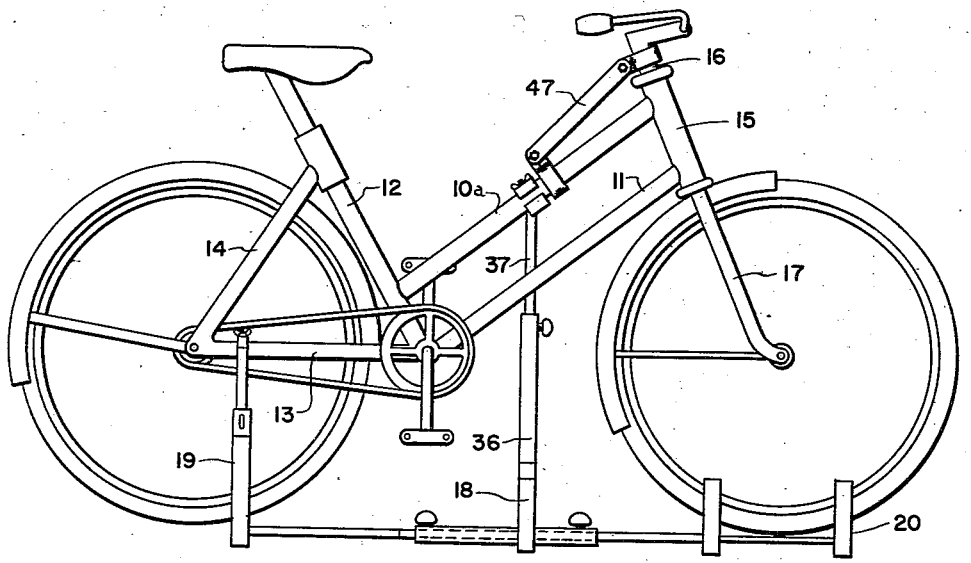
Figure 5:
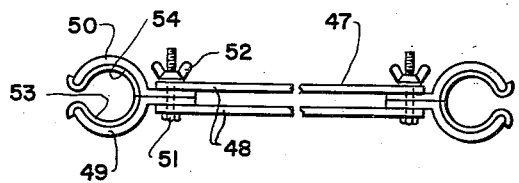

The invention, including embodiments therein, will be more fully understood by the following detailed description when read in conjunction with the attached drawings, in which:

Figure 1 is a side elevation of a man's bicycle held in a frame which is a preferred embodiment of the invention, Figure 2 is an enlarged sectional view taken along the line 2—2 of Figure 1 looking in the direction of the arrows, Figure 3 is an enlarged sectional view taken along the line 3—3 of Figure 1, Figure 4 is an elevational view of a lady's bicycle held in the frame of Figure 1, and includes a device for holding the steering post of the bicycle against rotation, and Figure 5 is an enlarged top view of the device for holding the steering post.

The bicycle shown in Figure 1 is of conventional design with a frame consisting of an upper structural bar 10, a lower structural bar 11, a rear structural bar 12, rear forks 13, upper rear forks 14, and a hollow post 15 into which the steering post 16 and the front forks 17 are rotatably fitted.

The supporting and holding frame for the bicycle has a main base member 18, a rear support 19, and a forward support 20. The rear support has a rear base member 21 which extends transversely to and on either side of the bicycle. An upwardly projecting arm on each end of the rear base member 21 preferably consists of a substantially vertical elongated hollow cylinder 22 anchored at its lower end to the rear base member 21 by any suitable means, a strengthening member 23 which may be formed integral with the rear base member at its lower end and fastened to the elongated hollow cylinder 22 at its upper end, and a substantially vertical rod 24 slidable in the elongated hollow cylinder 22. A wing-headed bolt 25 threaded in the hollow cylinder 22 to bear against the vertical rod 24 is preferably the means whereby the overall length of the upwardly projecting arm is adjustable. The wing-headed bolt 25 is retracted from its bearing position against the rod 24, the rod is extended from or pushed back into the hollow cylinder 22 to give the desired length of upwardly projecting arm, and the wing-headed bolt 25 is advanced to bear against the rod 24 in its selected position.

A means to support and hold the rear forks 13 of the bicycle is fixed to the upper end of each upwardly projecting arm. This means may take the form of a U-shaped rest into which the respective arm of the rear forks 13 merely rests, or it may be in the form of a clamping means (as shown in the drawings) which actually clamps the respective arm of the rear forks 13. This clamping means has a lower U-shaped member 26 which is preferably formed integral with the rod 24. A threaded stud 27 is fixed in the upper end of the rod 24 and its wing nut 28 is threaded thereon to force an upper inverted U-shaped member 29 downwards. The upper U-shaped member 29 and the lower U-shaped member 26, together with the tightening means made up of the stud 27 and the nut 28, comprise the clamping means referred to above.

The lower U-shaped member 26 and the upper U-shaped member 29 are preferably fitted with inserts 30 and 31, respectively, of rubber or other suitable resilient material to protect the painted surface of the rear forks 13 from being marked by the clamping means.

The front end which is supported by the forward support 20 which has a base member 32 preferably consisting of the foremost end of the rod 33. The rod 33 and its function will be more fully described hereinafter. It will be understood of course that the front base member could be formed of a member from the rod 33 but fastened thereto.

Two or more members 34, each having a cross-section as shown in Figure 3, are fixed to the rod 33 or other forward base member and together form a channel to receive and support the tire 35 of the front wheel of the bicycle. If desired, a single member having a longitudinal channel may be employed instead of the members 34.

A substantially vertical member is anchored at its lower end to the main base member 18. The vertical member is similar in construction to each of the upwardly projecting arms at the rear of the frame, and consists of an elongated hollow cylinder 36, a rod 37, and a wing-headed bolt 38. These latter members correspond in function and operation to cylinder 22, rod 24, and bolt 25 respectively. Dimples 39 are preferably formed in the rod 37 so that when the wing-headed bolt 38 is advanced into one of them there is little likelihood of the rod 37 being forced into the cylinder 36 by the weight of the bicycle. Similar dimples may be formed in rods 24, if desired.

The upper end of the rod 37 may be fitted with a clamping means such as is shown in conjunction with rods 24, or it may be fitted with a clamping means which may be swivelled about a horizontal axis. It will be understood that the latter type of clamping means may also be used in conjunction with the rods 24. Such a clamping means is shown in Figure 2 and preferably consists of clamping members 40 and 41 rotatable about a horizontal axis comprising a bolt 42 and a wing nut 43, a vertical bolt 44, a helical spring 45, and a wing nut 46 for tightening the clamping means against the action of the spring 45. The distinct advantage in having a clamping means rotatable about a horizontal axis and comprising, for example, the members 40 to 46 of Figure 2 is that it may be used to clamp a substantially horizontal bar such as the top structural bar 10 of a man's bicycle (see Figure 1), or a bar which is not horizontal such as the top bar 10a of a lady's bicycle (see Figure 4).

A further obvious arrangement (not shown) is where the rod 37 may be fitted with a device whereby one or more of the other structural bars may be clamped and the bicycle supported thereby. Alternatively, the rod 37 may also be fitted with a device for clamping the steering post 16. This latter arrangement would be very useful when the front wheel had been removed for repairing same.

If desired, the steering post may be clamped and held by a device 47 which is separate and distinct from the frame for supporting and holding a bicycle. Such a device is shown in Figure 5, and comprises a clamping means at either end and a connecting member or members 48. Each clamping means preferably consists of U-shaped clamping members 49 and 50, bolt 51, and wing nut 52. As in the case of clamping members 30 and 31, rubber inserts 53 and 54 or the like are preferably employed.

It is noted that a rubber protecting means 55 and 56 are also preferably used in conjunction with clamping members 40 and 41 (Figure 2).

The rear support 19 is connected to the main base member 18 through a first length-adjusting member which preferably consists of a rod 57 fastened at one end to the rear support member 19, and a hollow cylinder 58 into which the rod 57 slides. The first length-adjusting member is similar in function and operation to the upwardly projecting arms described above. A wing nut 59 similar to the wing nuts 25 is used to fix the selected adjustment of the first length-adjusting member. A second length-adjusting member similar to the first length-adjusting member connects the forward support to the main base member. The second length-adjusting member comprises rod 33, cylinder 60, and wing nut 61. The cylinders 58 and 60 are fixed to the main base member 18 by any convenient method.

It is noted that the elongated hollow cylinder 36 is anchored to the main base member 18 preferably slightly off-center in a direction transverse to the bicycle so that the hollow cylinder 36 and the rod 37 may readily pass on one side of the structural bars of the bicycle.

What I claim as my invention is:

1. A frame for supporting and holding a bicycle comprising a transversely-extending and centrally-located main base member, a rear support having a base member extending transversely on either side of the frame, an upwardly projecting extensible arm on each end of the rear base member, means on each of said arms for engaging and supporting one of the rear forks of a bicycle to be supported by the frame, a forward support having a base member extending transversely on either side of the frame, a longitudinally-extending channel-shaped member fixed to the forward base member to receive and support the front wheel of said bicycle, said channel-shaped member being V-shaped in cross section, a pair of sockets side by side on the main base member and opening towards the rear and forward supports, a rod connected to the rear support and slidably fitting in one socket, a rod connected to the forward support and slidably fitting in the other socket, clamping means at each socket for releasably gripping the rod in the latter, a substantially vertical member anchored in said main base member at a point slightly to one side of center in a transverse direction, said substantially vertical member being adjustable in length, and clamping means at the upper end of the vertical member for gripping one of the structural bars of the bicycle.

2. A frame for supporting and holding a bicycle comprising a transversely-extending and centrally-located main base member, a rear support having a base member extending transversely on either side of the frame, an upwardly projecting extensible arm on each end of the rear base member, means on each of said arms for engaging and supporting one of the rear forks of a bicycle to be supported by the frame, a forward support having a base member extending transversely on either side of the frame, a longitudinally-extending channel-shaped member fixed to the forward base member to receive and support the front wheel of said bicycle, said channel-shaped member being V-shaped in cross section, a pair of sockets side by side on the main base member and opening towards the rear and forward supports, a rod connected to the rear support and slidably fitting in one socket, a rod connected to the forward support and slidably fitting in the other socket, clamping means at each socket for releasably gripping the rod in the latter, a substantially vertical member anchored in said main base member at a point slightly to one side of center in a transverse direction, said substantially vertical member being adjustable in length, and a clamp secured to the upper end of the vertical member and extending over the transverse center of the main base member for gripping one of the structural bars of the bicycle, said clamp being rotatable about an axis extending transversely of the main base member.

3. A frame for supporting and holding a bicycle comprising a transversely-extending and centrally-located main base member, a rear support having a base member extending transversely on either side of the frame, an upwardly projecting extensible arm on each end of the rear base member, a clamp on the upper end of each of said arms and extending inwardly therefrom for releasably gripping one of the rear forks of a bicycle supported by the frame, a forward support having a base member extending transversely on either side of the frame, a longitudinally-extending channel-shaped member fixed to the forward base member to receive and support the front wheel of said bicycle, said channel-shaped member being V-shaped in cross section, a pair of sockets side by side on the main base member and opening towards the rear and forward supports, a rod connected to the rear support and slidably fitting in one socket, a rod connected to the forward support and slidably fitting in the other socket, clamping means at each socket for releasably gripping the rod in the latter, a substantially vertical member anchored in said main base member at a point slightly to one side of center in a transverse direction, said substantially vertical member being adjustable in length, and clamping means at the upper end of the vertical member for gripping one of the structural bars of the bicycle.

References Cited in the file of this patent

UNITED STATES PATENTS

| | | |
|---|---|---|
| 136,801 | Woolensak | Mar. 11, 1873 |
| 431,740 | Curtis | July 8, 1890 |
| 506,495 | Hart | Oct. 10, 1893 |
| 547,412 | Boerum | Oct. 8, 1895 |
| 593,521 | Fowler | Nov. 9, 1897 |
| 623,785 | Hubbell | Apr. 25, 1899 |
| 635,435 | Fowler | Oct. 24, 1899 |
| 2,045,942 | Brody | June 30, 1936 |

FOREIGN PATENTS

| | | |
|---|---|---|
| 14,740 | Great Britain | Aug. 3, 1895 |
| 110,212 | Switzerland | Aug. 17, 1925 |